US012591671B2

(12) United States Patent
Lin

(10) Patent No.: US 12,591,671 B2
(45) Date of Patent: Mar. 31, 2026

(54) DETECTING MALWARE ACTIVITY USING KERNEL-BASED PROCESS DISCOVERY DETECTION

(71) Applicant: Sophos Limited, Abingdon (GB)

(72) Inventor: Tzu-yi Lin, Herndon, VA (US)

(73) Assignee: Sophos Limited, Abingdon (GB)

( * ) Notice: Subject to any disclaimer, the term of this patent is extended or adjusted under 35 U.S.C. 154(b) by 229 days.

(21) Appl. No.: 18/213,627

(22) Filed: Jun. 23, 2023

(65) Prior Publication Data

US 2024/0427888 A1     Dec. 26, 2024

(51) Int. Cl.
G06F 21/56     (2013.01)
G06F 21/55     (2013.01)

(52) U.S. Cl.
CPC .......... G06F 21/566 (2013.01); G06F 21/554 (2013.01)

(58) Field of Classification Search
CPC ....... G06F 21/554; G06F 21/56; G06F 21/566
See application file for complete search history.

(56) References Cited

U.S. PATENT DOCUMENTS

| | | | | |
|---|---|---|---|---|
| 10,726,127 | B1* | 7/2020 | Steinberg .............. | G06F 21/566 |
| 2009/0070878 | A1* | 3/2009 | Wang ...................... | G06F 21/52 |
| | | | | 726/24 |
| 2011/0209219 | A1* | 8/2011 | Zeitlin .................. | G06F 21/566 |
| | | | | 726/23 |
| 2013/0247180 | A1* | 9/2013 | Camp ................... | G06F 21/577 |
| | | | | 726/22 |
| 2018/0189490 | A1* | 7/2018 | Maciejak .............. | G06F 21/566 |
| 2021/0218759 | A1* | 7/2021 | Ahmed ............... | H04L 63/0281 |
| 2022/0035920 | A1* | 2/2022 | Thomas ................ | G06F 21/566 |
| 2024/0152610 | A1* | 5/2024 | Wilson ................... | G06F 21/53 |

FOREIGN PATENT DOCUMENTS

KR       20180060819 A  *  6/2018  ............. G06F 21/56

* cited by examiner

*Primary Examiner* — Jayesh M Jhaveri
(74) *Attorney, Agent, or Firm* — Cesari and McKenna, LLP

(57)     ABSTRACT

Malware attacks seek to identify vulnerabilities that can be exploited by enumerating currently-executing processes in the operating system of a target device for injection of a malicious payload. By detecting process enumeration events occurring at the kernel level, known or suspected malware enumeration activity can be identified and mitigated.

17 Claims, 7 Drawing Sheets

NOTE: S = SECURITY AGENT

702 EXECUTE SECURITY AGENT

704 DETECT PROCESS OBJECT REFERENCE EVENTS

706 DETERMINE WHETHER PROCESS OBJECT REFERENCE EVENTS ARE INDICATIVE OF MALWARE ACTIVITY

708 INITIATE MALWARE REMEDIATION

700

DETECTING MALWARE ACTIVITY USING KERNEL-BASED PROCESS DISCOVERY DETECTION

TECHNICAL FIELD

The subject matter of the application relates generally to methods and systems for detecting malware activity on a computing system through kernel-based process discovery detection.

BACKGROUND

Malware uses different ways to identify vulnerabilities in a target computing system. One approach is to enumerate all processes running in the target system to determine whether one or more of the processes are viable candidates for the purpose of deploying a malicious payload. For example, in a Windows® operating system environment, malware may use Windows® application programming interface (API) functions such as CreateToolhelp32Snapshot( ) or NtQuerySystemInformation( ) to perform the process enumeration task.

Traditional malware mitigation techniques load an anti-virus dynamic linked library (DLL) in each process to monitor the API calls to the Windows® enumeration functions. However, sophisticated malware can overwrite the DLL loaded in each process and thereby disable the enumeration detection. There remains a need for improved techniques to detect malware-initiated process enumeration that are not susceptible to being disabled or compromised by the malware.

SUMMARY

In general, it may be beneficial to provide systems, methods and computer program products that detect enumeration activity using process object reference events occurring in the operating system kernel. Because the kernel comprises low-level functionality in the system space of the operating system, malware executing in the user space cannot modify the kernel to bypass or disable the detection of process enumeration initiated by the malware.

In general, in an aspect, a computer program product may include computer executable code embodied in a non-transitory computer readable medium that, when executing on one or more computing devices, performs steps that may include: executing a security agent on an endpoint computing device, the security agent including at least one component configured to monitor process object reference events occurring in an operating system kernel on the endpoint computing device; detecting a plurality of process object reference events occurring in the operating system kernel, each process object reference event associated with an event tag; determining whether the plurality of process object reference events occurring in the operating system kernel are indicative of malware activity on the endpoint; and initiating a malware remediation process when the plurality of process object reference events occurring in the operating system kernel are indicative of malware activity on the endpoint computing device.

In general, in an aspect, a method of detecting malware activity may include executing a security agent on an endpoint computing device, the security agent including at least one component configured to monitor process object reference events occurring in an operating system kernel on the endpoint computing device; detecting a plurality of process object reference events occurring in the operating system kernel, each process object reference event associated with an event tag; determining whether the plurality of process object reference events occurring in the operating system kernel are indicative of malware activity on the endpoint; and initiating a malware remediation process when the plurality of process object reference events occurring in the operating system kernel are indicative of malware activity on the endpoint computing device.

In general, in an aspect, a system for detecting malware activity may include an endpoint computing device including a processor and a memory, where the processor may be configured to: execute a security agent, the security agent including at least one component configured to monitor process object reference events occurring in an operating system kernel on the endpoint computing device; detect a plurality of process object reference events occurring in the operating system kernel, each process object reference event associated with an event tag; determine whether the plurality of process object reference events occurring in the operating system kernel are indicative of malware activity on the endpoint; and initiate a malware remediation process when the plurality of process object reference events occurring in the operating system kernel are indicative of malware activity on the endpoint computing device.

In some implementations, the security agent executes in a user space of the operating system and the kernel executes in a system space of the operating system. In some implementations, the security agent uses a kernel trace function to monitor the process object reference events occurring in the operating system kernel.

In some implementations, detecting the plurality of process object reference events occurring in the operating system kernel comprises filtering the plurality of process object reference events to identify a subset of the process object reference events that are associated with a process enumeration event tag. In some implementations, the endpoint computing device detects the plurality of process object reference events during a defined time period. In some implementations, the endpoint computing device determines that the plurality of process object reference events are indicative of malware activity when the number of process object reference events associated with the process enumeration event tag that are detected during the defined time period exceeds a threshold value.

In some implementations, initiating a malware remediation process comprises transmitting a message comprising a notification of the malware activity to a remote computing device. In some implementations, initiating a malware remediation process comprises scanning a list of processes executing in a user space of the operating system to identify one or more processes that are known or suspected to be associated with malware.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
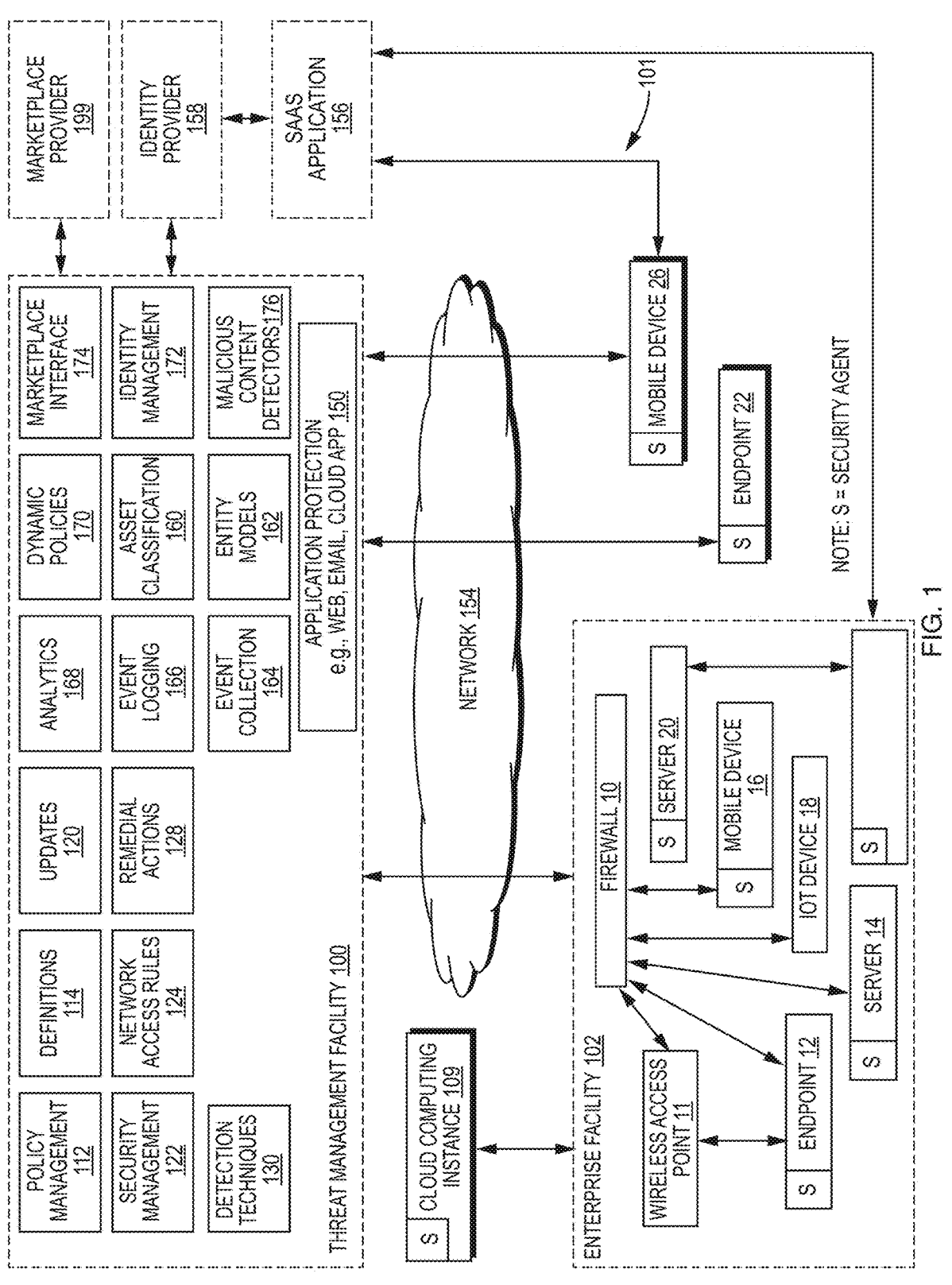
FIG. 1 depicts a block diagram of a threat management system, according to one example embodiment.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

The technology described herein provides methods, systems, and computer program products for deploying a security agent to detect process object reference events occurring in the kernel of the operating system and analyze the process object reference events to determine whether the events are indicative of malware activity. Beneficially, the technology described herein enables the identification and mitigation of malware on an endpoint computing device using operating system functionality that cannot be compromised or modified by malware present on the system.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As just one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-176 may be provided as part of a security agent S that is included in software running on a compute instance 10-26 within the enterprise facility. Some or all of one or more of the facilities 100, 112-176 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure™, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce™, Amazon Web Services™ (AWS) applications, Google Apps™ applications, Microsoft Office 365™ applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations.

Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a blacklist, an allowed list, a whitelist, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows™, MacOS™, Linux™, Android™, iOS™). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
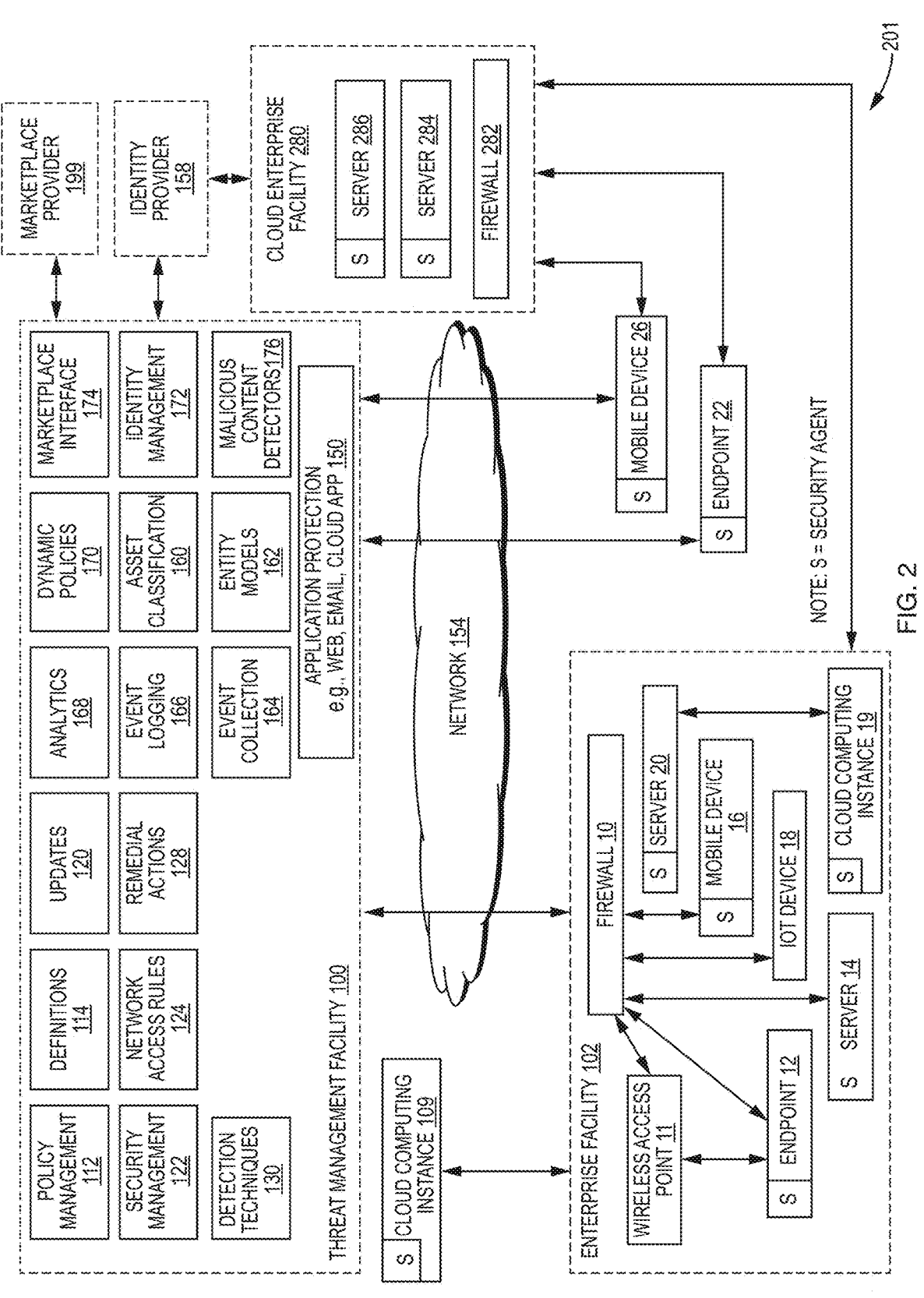
FIG. 2 depicts a block diagram of a threat management system, according to one example embodiment.

FIG. 2 depicts a block diagram of a threat management system 201 such as any of the threat management systems described herein and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
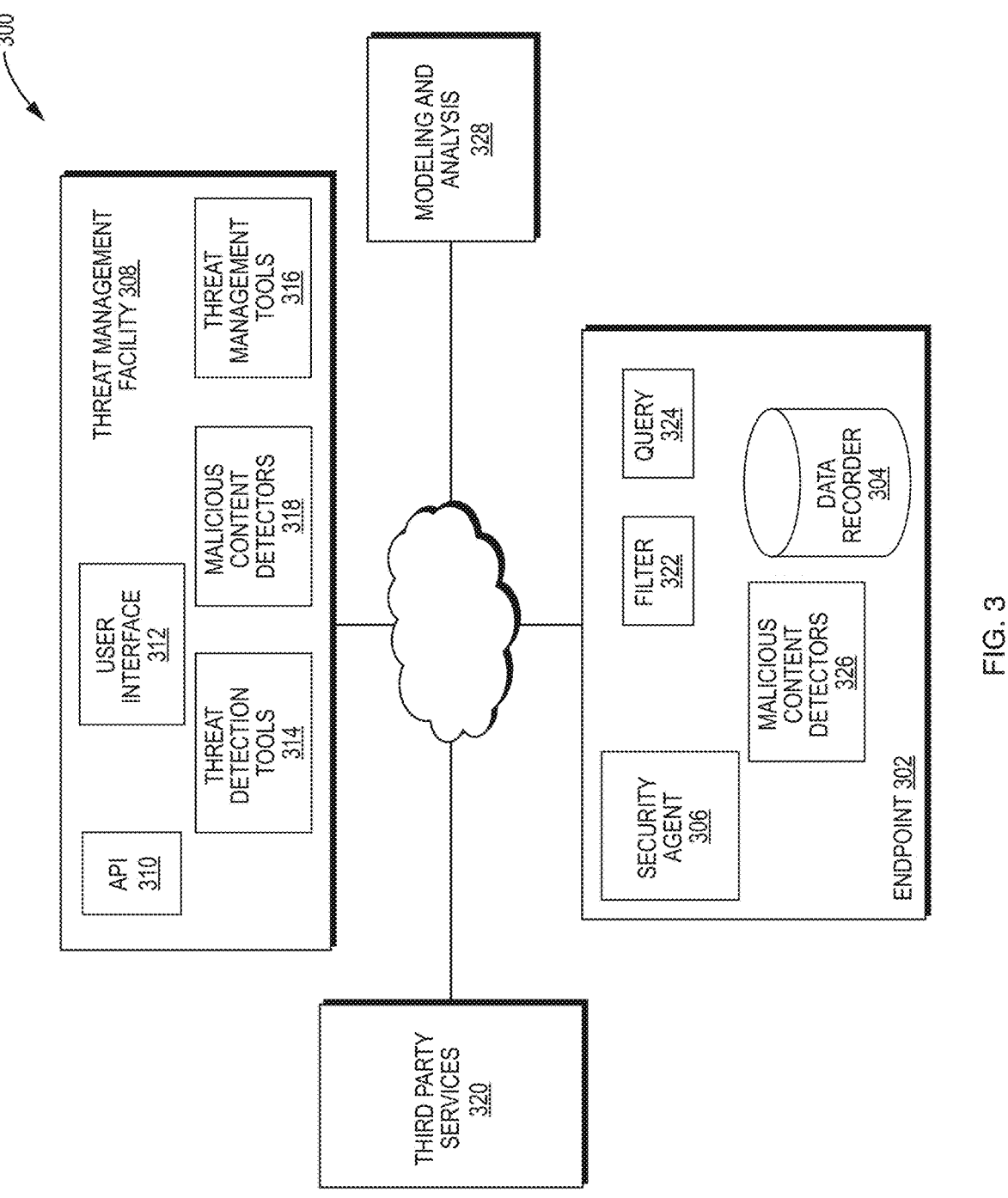
FIG. 3 illustrates a system for enterprise network threat detection, according to one example embodiment.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat detection tools 314 and/or threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314 and threat management tools 316.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third-party context, information, administration and security tools, and so forth. The application programming interface 310 may also or instead provide a programmatic interface for hosted applications, identity provider integration tools or services, and so forth.

The user interface 312 may include a website or other graphical interface or the like and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature-based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 328, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302 and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty-eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
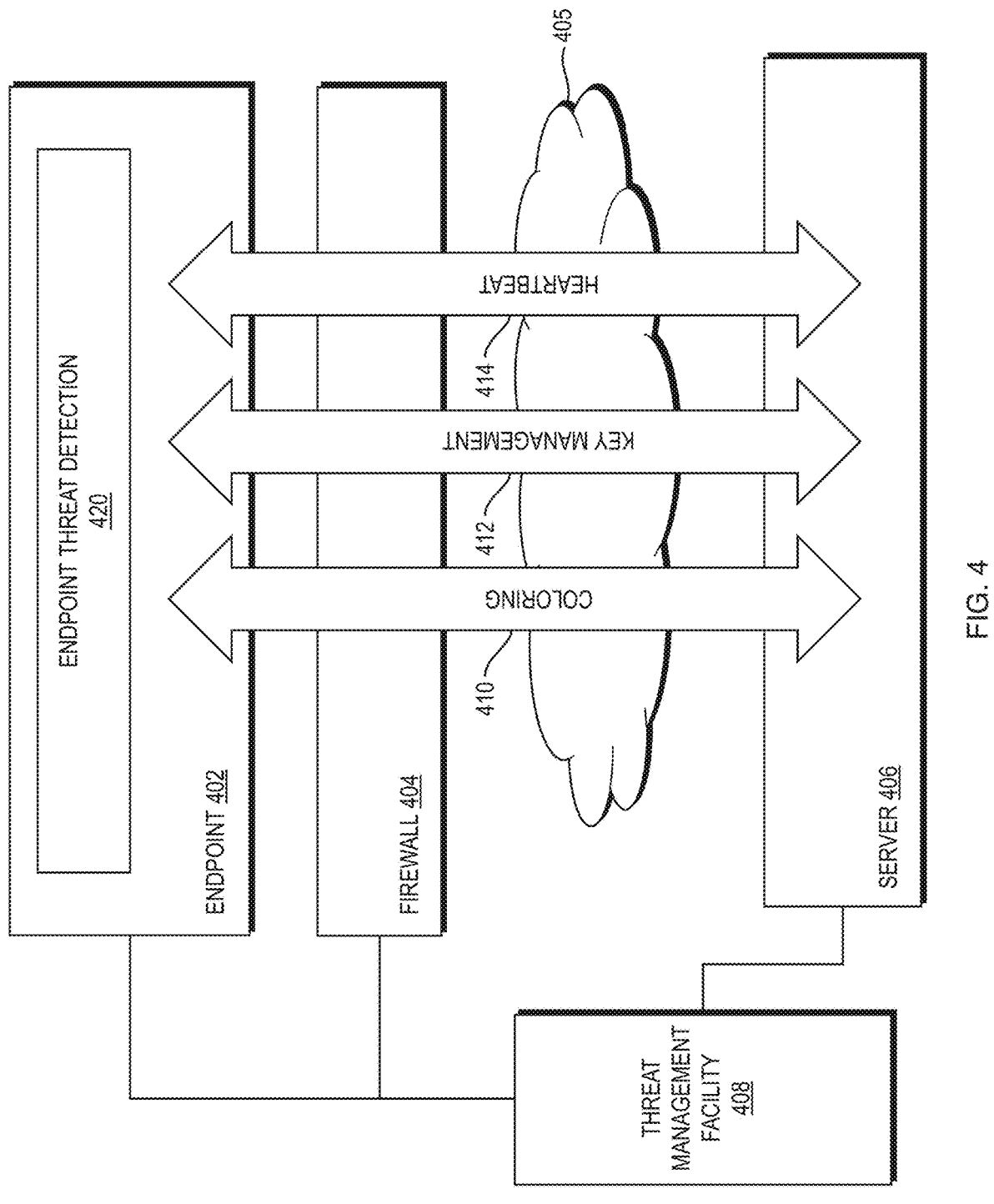
FIG. 4 illustrates a threat management system, according to one example embodiment.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

As mentioned above, one aspect of the invention described herein is a security agent that detects known or suspected malware activity on an endpoint computing device using event tracing and analysis of process object reference events occurring in a kernel of the operating system on the endpoint computing device. By monitoring and analyzing events occurring in the operating system kernel—the functionality of which cannot be modified or hijacked by malware—the security agent avoids the limitations of existing process-based malware detection techniques that rely on operations occurring in the user space of the operating system and which are susceptible to malware attacks designed to disrupt such detection.

Figure 5:
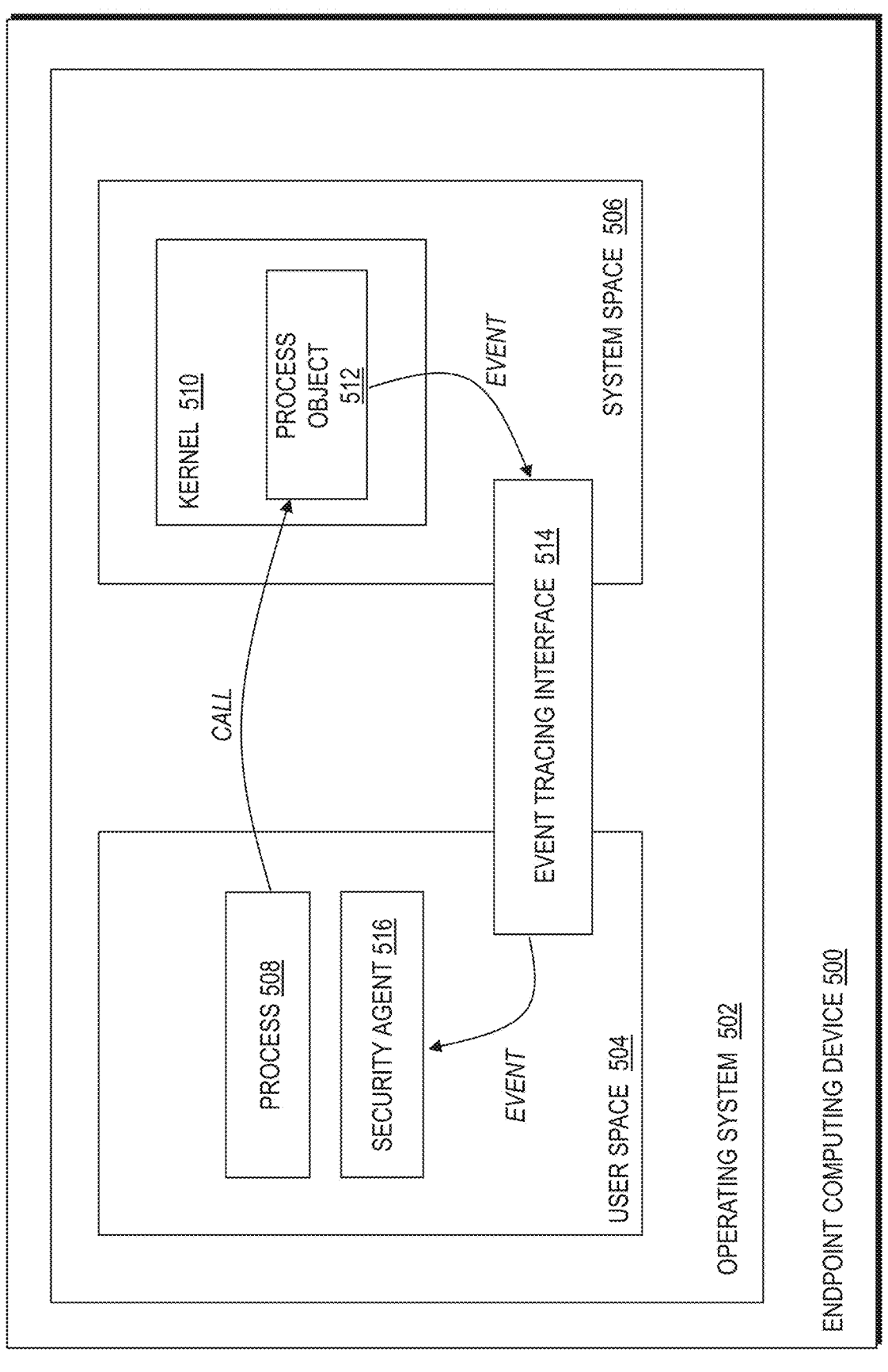
FIG. 5 illustrates a block diagram of an endpoint computing device according to embodiments.

FIG. 5 shows a block diagram of an endpoint computing device 500. The endpoint computing device 500 may be executing an operating system 502 with a user space 504 and a system space 506. The endpoint computing device 500 may be one or more of the devices illustrated in FIGS. 1-4, including but not limited to the endpoint 22 of FIGS. 1 and 2, the endpoint 302 of FIG. 3, and/or the endpoint 402 of FIG. 4. An exemplary operating system 502 is Microsoft® Windows® 10 available from Microsoft Corp. of Redmond, Washington. According to general computing principles, the operating system 502 may include any system software that manages computer hardware and software resources and provides common service for computer programs such as input, output, memory allocation, and so forth. In general, an application will execute in the user space 504, e.g., as a process 508 (or multiple processes 508) and may issue function calls 510 into a kernel 512 executing in the system space 506 as needed. In one aspect relevant to the following disclosure, this may include process related function calls such as the creation of process objects 514 in the kernel 512 that relate to the process 508. For example, when an application process 508 is launched in the user space 504, the process 508 issues a call to the kernel 510 for the creation of a process object 514 that corresponds to the launched process 508. In general, the process object 514 is a data structure that contains information (also called 'context')

about the current operational state of the process 508. In general, the kernel 512 references information in the process object 514 when scheduling the process 508 to run on a processor of the endpoint computing device 500.

The operating system 502 may also provide an event tracing interface 514 for applications in the user space 504—such as security agent 518—to receive events 516 from the kernel 512. In general, the event tracing interface 514 allows applications in the user space 504 and kernel-mode drivers in the system space 506 to provide events to a log file for consumption by other applications. Generally, an event comprises information that describes the current state of an application or an operation. Events can be used by consuming applications for a variety of purposes, including but not limited to debugging, performance analysis, error handling, and malware activity detection. An exemplary event tracing interface 514 is the Event Tracing for Windows® (ETW) API included in the Microsoft® Windows® operating system.

Figure 6:
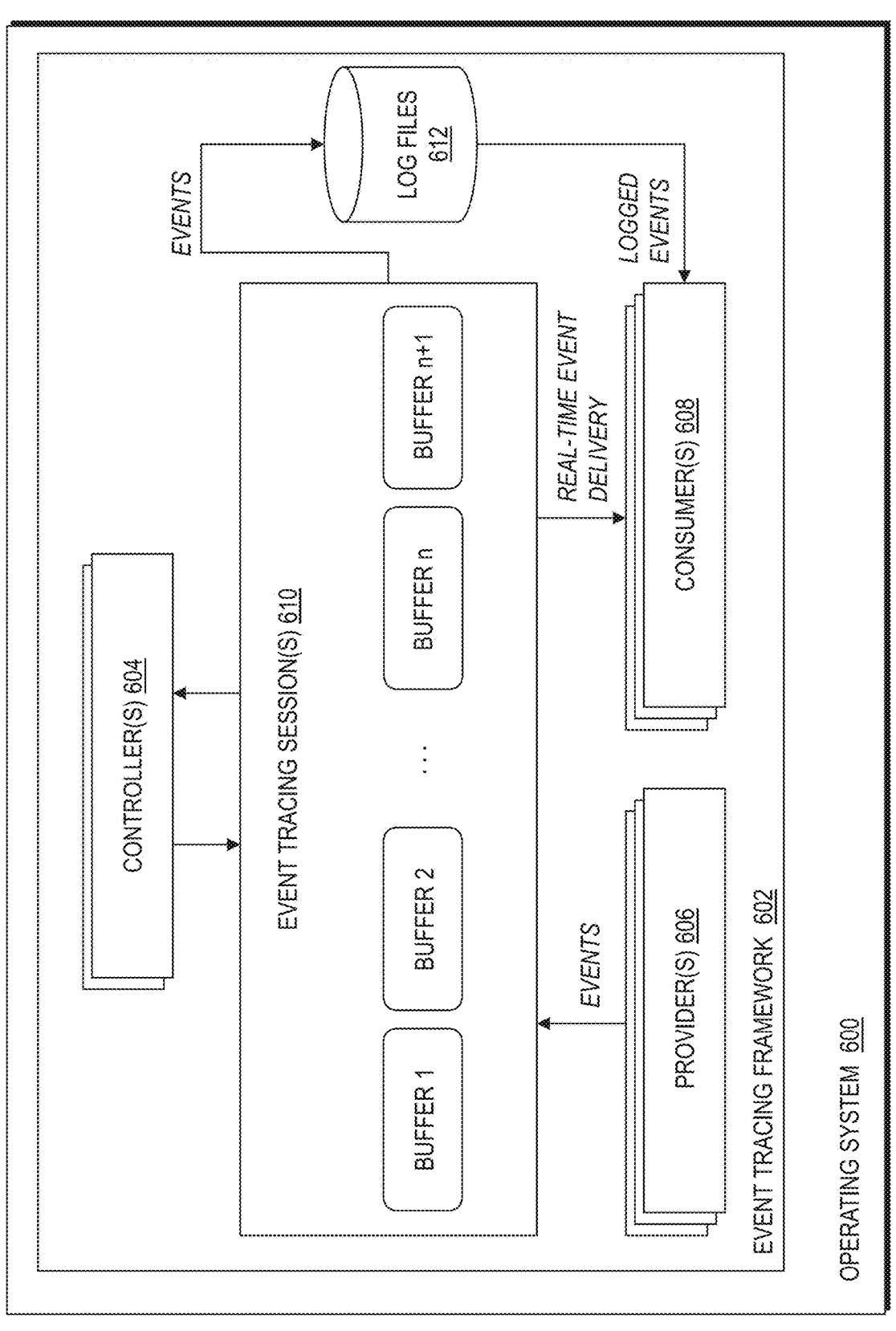
FIG. 6 illustrates a block diagram of an event tracing interface according to embodiments.

FIG. 6 is a block diagram of an event tracing framework 602 in an operating system 600 for implementation in an endpoint computing device. The framework 602 includes controllers 604, providers 606, consumers 608, event tracing sessions 610, and log files 612. Controllers 604 comprise one or more applications that generally configure and manage the event tracing framework, including functions such as defining the size and location of the log file, starting and stopping event tracing sessions, enabling providers to log events to a tracing session, managing the size of the buffer pool, and obtaining execution statistics for sessions. Providers 606 comprise one or more applications that are instrumented to generate tracing events during an event tracing session. Generally, a provider 606 registers with the controllers 604 which can enable or disable event tracing in the provider. Events generated by the providers 606 are stored in buffers during an event tracing session 610 and transferred from the buffers to a log file stored in log files 612. Consumers 608 are applications that may be configured to select one or more event tracing sessions 610 from which to receive events. In some implementations, consumers 608 can request events from multiple event tracing sessions 610 simultaneously. Consumers 608 may receive events stored in log files 612, or from sessions 610 that deliver events in real time.

Figure 7:
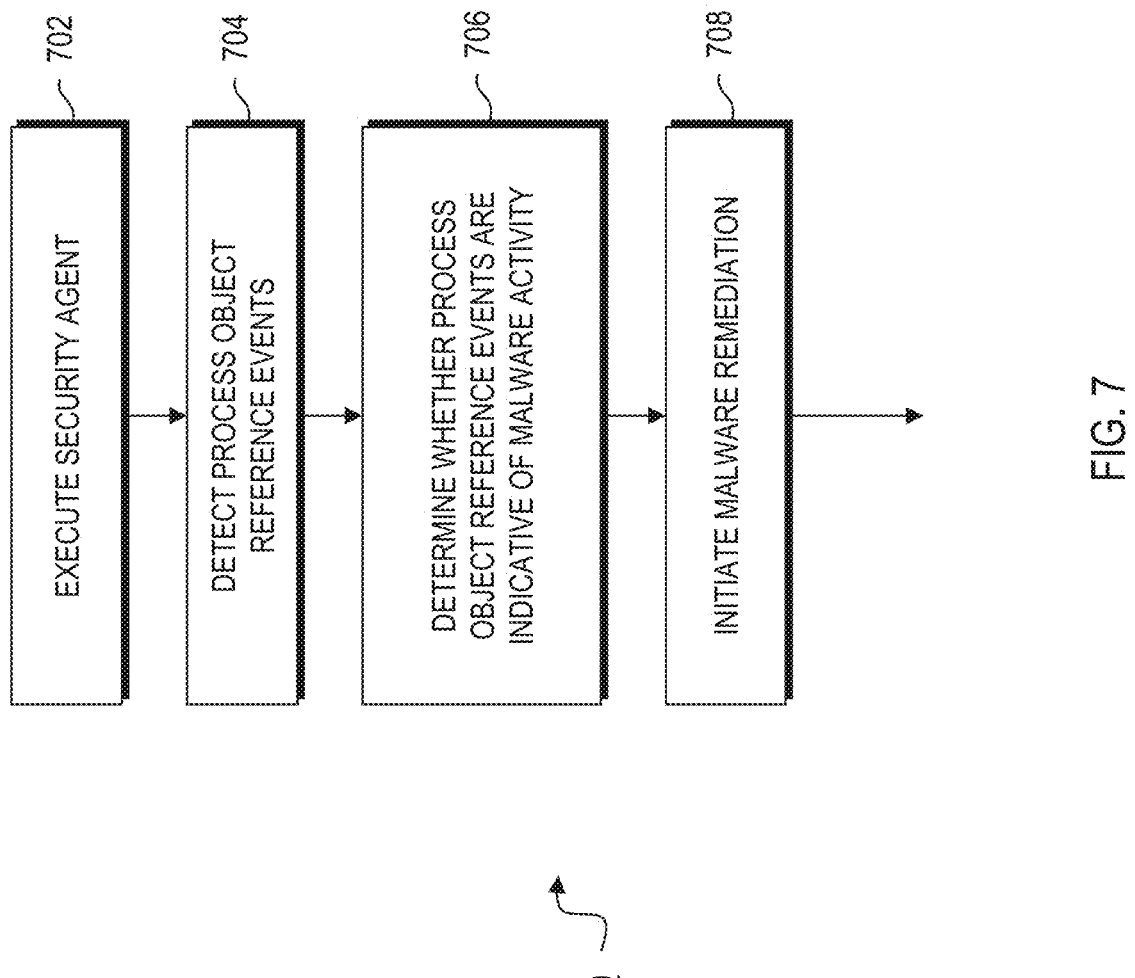
FIG. 7 illustrates a flow diagram of a method for detecting malware activity on an endpoint computing device, according to one embodiment.

FIG. 7 is a flow diagram of a method 700 for detecting malicious activity on an endpoint computing device, according to an embodiment. At block 702, the method may include executing a security agent on an endpoint computing device (for example, security agent 516 of endpoint computing device 500 as illustrated in FIG. 5). In some implementations, the security agent includes at least one component configured to monitor process object reference events occurring in an operating system kernel (for example, kernel 510 of operating system 502 as illustrated in FIG. 5) on the endpoint computing device. In some implementations, the security agent can connect to an event tracing interface (for example, event tracing interface 514 of FIG. 5) as a consumer application to receive events from the event tracing framework that are generated by the kernel of the operating system.

At block 704, the security agent 516 detects a plurality of process object reference events occurring in the operating system kernel 510. As described above, the security agent 516 is configured to consume process object events generated by the kernel 510 via the event tracing interface 514. The security agent 516 can be configured to interface with a kernel logging event tracing session in the event tracing interface 514 and detect process object reference events occurring in the kernel 510 that are logged in the tracing session of the interface 514. For example, to detect process object reference events in a Windows® operating system environment, the security agent 516 can enable the ObTrace class using the TraceSetInformation function with the EVENT_TRACE_PROPERTIES structure's EnableFlags member equal to PERF_OB_HANDLE (0x80000040), as described at learn.microsoft.com/en-us/windows/win32/etw/obtrace. In some implementations, the security agent 516 is configured to utilize the Microsoft® KrabsETW library (available at github.com/microsoft/krabsetw) which provides a wrapper around low-level ETW trace consumption functions. The KrabsETW library enables the PERF_O-B_OBJECT (0x80000080) event to be used with the Trace-SetInformation function to detect process object reference events (see, e.g., perfinfo_groupmask.hpp at github.com/microsoft/krabsetw/blob/master/krabs/).

In some implementations, each process object reference event record logged by the event tracing interface 514 is associated with an event tag. For example, the process object reference event record can include a Tag field that comprises the event tag. The event tag is a four-byte string that represents how the operating system 502 references an object to support object reference tracing. The event tag can be used by the security agent 516 to identify certain process object reference events that relate to process enumeration. Specifically, operating system functions such as CreateToolhelp32Snapshot( ) or NtQuerySystemInformation( ) can perform enumeration of processes 508 running in the user space 504 by calling the ObReferenceObjectSafe With Tag routine with the tag value 'PsEn' (which appears in the trace as tag value 'nEsP'). The security agent 516 advantageously identifies process object reference events that contain the tag value 'PsEn' as indicative of process enumeration activity. The security agent 516 can filter out other process reference events not relating to process enumeration as noise for the purpose of detecting malware activity.

In some implementations, the tag value 'PsEn' is also used by the operating system 502 when enumerating jobs and threads. Because these events may not be relevant to the consideration of detecting process-based malware activity on the endpoint computing device 500, the security agent 516 can be configured to filter the kernel trace to detect only process enumeration events. To accomplish the filtering, the security agent 516 can reference the EVENT_TRAC-E_TAG_FILTER_INFORMATION struct available in the Windows® operating system to identify which enumeration events correspond to process enumeration activity. The EVENT_TRACE_TAG_FILTER_INFORMATION struct is available in the header file NTETW.H, which is published in the "minwin" directory of the Windows® Driver Kit (WDK) for Windows® 10 in the original and Version 1511 editions. The NTETW.H header is a private symbol file used in building the operating system kernel for Windows® 10. In some embodiments, an EVENT_TRACE_TAG_FILTER-_INFORMATION struct to NtSetSystemInformation( ) call to receive only process-related performance trace events and then a PERFINFO_GROUPMASK value is passed to Trace-SetInformation ( ) call to enable object reference event tracing. Upon receiving event data from the event tracing interface 514, the security agent 516 identifies the specific process enumeration events using the techniques described above.

At block 706, the security agent 516 determines whether the plurality of process object reference events occurring in the operating system kernel 510 are indicative of malware activity on the endpoint computing device 500. In isolation, a single process enumeration event or a few process enumeration events over a certain period of time may not be indicative of malware activity. As can be appreciated, many applications and operating system functions can perform process enumeration for legitimate reasons. As a result, the security agent 516 can be configured to determine that malware activity may be occurring by analyzing the process enumeration events in aggregate. In some implementations, the security agent 516 is configured to detect process object reference events with the 'PsEn' tag that occur during a defined time period (e.g., one second, five seconds, one minute, etc.). For example, the security agent 516 can group all of the process object reference events with the 'PsEn' tag that occurred in the defined time period and perform one or more analyses on the grouped events.

In some implementations, the security agent 516 counts the number of process object reference events with the 'PsEn' tag that occurred during the defined time period and compares the number to a threshold value (e.g., twenty, fifty, one hundred, two hundred, etc.). When the number of events exceeds the threshold, the security agent 516 can be configured to determine that the process object reference events are indicative of suspected malware activity. The threshold value can be configured according to any number of different security objectives or malware attack patterns, and it should be appreciated that in some implementations the security agent 516 can maintain a plurality of threshold values for different time periods and/or different levels of activity to provide for malware detection with increased granularity.

At block 708, the security agent 516 initiates a malware remediation process when the plurality of process object reference events occurring in the operating system kernel 510 are indicative of malware activity on the endpoint computing device 500. In some implementations, the security agent 516 is configured to generate and transmit a message to one or more remote computing devices or services (such as threat management facility 308 of FIG. 3). The message can include a notification indicating that malware activity has occurred on the endpoint computing device and provide information associated with the malware activity, such as the number of process object reference events with the 'PsEn' tag that were detected during the defined time period. The threat management facility 308 can be configured to perform remediation tasks to identify the malware and/or interdict the malware activity on the endpoint computing device. In some embodiments, the security agent 516 transmits the message to a remote computing device in a JSON format.

In some implementations, the security agent 516 is configured to initiate a process scan in the user space 504 of the operating system 502. The process scan can comprise scanning a list of processes executing in the user space 504 to identify one or more processes that are known or suspected to be associated with malware. For example, the security agent 516 can include a file or other data structure that contains a list of known or suspected malware processes. During the process scan, the security agent 516 can compare the list of scanned processes with the list of known or suspected malware processes to determine whether there are any matches. The security agent 516 can include the names of any matched processes in the message to the threat management facility 308 and/or perform localized remediation actions such as terminating the matched processes from executing in the user space 504.

Thus, as set forth above, the methods and systems described herein provide for deployment of a security agent on, e.g., an endpoint computing device, where the security agent detects process object reference events occurring in the kernel of the operating system and analyzes the process object reference events to determine whether the events are indicative of malware activity that may be present on the computing device. From a technical perspective, the methods and systems beneficially enable the rapid identification of malware activity by leveraging low-level operating system functionality that cannot be compromised by the malware to avoid detection or mitigation efforts.

In addition, the methods and systems advantageously can be configured using targeted threshold values and analyses to distinguish between process-level activity that may not be indicative of malware and other similar activity that may result from malware operations-thereby improving the rate of positive malware detection. Importantly, the security agent can combine the process object reference event analysis described herein with other metrics or indicia of malware activity that may be present on the endpoint computing device (e.g., as may be collected by the security agent and/or a remote computing device that is monitoring the endpoint and/or a corresponding computing environment or network) to identify the specific type or signature of malware so that appropriate remediation and security enhancement steps can be taken to prevent future attacks.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:

executing a security agent on an endpoint computing device, the security agent including at least one component configured to monitor process object reference events occurring in an operating system kernel on the endpoint computing device;

detecting a plurality of process object reference events occurring in the operating system kernel, each process object reference event associated with an event tag;

filtering the plurality of process object reference events based upon (i) the event tag and (ii) data in an operating system structure to identify process enumeration events within the plurality of process object reference events;

determining whether the filtered process object reference events occurring in the operating system kernel are indicative of malware activity on the endpoint; and initiating a malware remediation process when the filtered process object reference events occurring in the operating system kernel are indicative of malware activity on the endpoint computing device.

2. The computer program product of claim 1, wherein the security agent executes in a user space of the operating system and the kernel executes in a system space of the operating system.

3. The computer program product of claim 1, wherein the security agent uses a kernel trace function to monitor the process object reference events occurring in the operating system kernel.

4. The computer program product of claim 1, wherein the filtered process object reference events are associated with a process enumeration event tag.

5. The computer program product of claim 4, wherein the endpoint computing device detects the plurality of process object reference events during a defined time period.

6. The computer program product of claim 5, wherein the endpoint computing device determines that the plurality of process object reference events are indicative of malware activity when the number of process object reference events associated with the process enumeration event tag that are detected during the defined time period exceeds a threshold value.

7. The computer program product of claim 1, wherein initiating a malware remediation process comprises transmitting a message comprising a notification of the malware activity to a remote computing device.

8. The computer program product of claim 1, wherein initiating a malware remediation process comprises scanning a list of processes executing in a user space of the operating system to identify one or more processes that are known or suspected to be associated with malware.

9. A method of detecting malware activity, the method comprising:

executing a security agent on an endpoint computing device, the security agent including at least one component configured to monitor process object reference events occurring in an operating system kernel on the endpoint computing device;

detecting a plurality of process object reference events occurring in the operating system kernel, each process object reference event associated with an event tag;

filtering the plurality of process object reference events based upon (i) the event tag and (ii) data in an operating system structure to identify process enumeration events within the plurality of process object reference events;

determining whether the filtered process object reference events occurring in the operating system kernel are indicative of malware activity on the endpoint; and initiating a malware remediation process when the filtered process object reference events occurring in the operating system kernel are indicative of malware activity on the endpoint computing device.

10. The method of claim 9, wherein the security agent executes in a user space of the operating system and the kernel executes in a system space of the operating system.

11. The method of claim 9, wherein the security agent uses a kernel trace function to monitor the process object reference events occurring in the operating system kernel.

12. The method of claim 9, wherein the filtered process object reference events are associated with a process enumeration event tag.

13. The method of claim 12, wherein the endpoint computing device detects the plurality of process object reference events during a defined time period.

14. The method of claim 13, wherein the endpoint computing device determines that the plurality of process object reference events are indicative of malware activity when the number of process object reference events associated with the process enumeration event tag that are detected during the defined time period exceeds a threshold value.

15. The method of claim 9, wherein initiating a malware remediation process comprises transmitting a message comprising a notification of the malware activity to a remote computing device.

16. The method of claim 9, wherein initiating a malware remediation process comprises scanning a list of processes executing in a user space of the operating system to identify one or more processes that are known or suspected to be associated with malware.

17. A system for detecting malware activity, the system comprising:

an endpoint computing device including a processor and a memory, the processor configured to:

execute a security agent, the security agent including at least one component configured to monitor process object reference events occurring in an operating system kernel on the endpoint computing device;

detect a plurality of process object reference events occurring in the operating system kernel, each process object reference event associated with an event tag;

filtering the plurality of process object reference events based upon (i) the event tag and (ii) data in an operating system structure to identify process enumeration events within the plurality of process object reference events;

determine whether the filtered process object reference events occurring in the operating system kernel are indicative of malware activity on the endpoint; and initiate a malware remediation process when the filtered process object reference events occurring in the operating system kernel are indicative of malware activity on the endpoint computing device.

\* \* \* \* \*